United States Patent [19]

Rieper

[11] 4,285,265
[45] Aug. 25, 1981

[54] TACKING RIVET

[75] Inventor: Hermann Rieper, Buxtehude, Fed. Rep. of Germany

[73] Assignee: Messerschmitt-Boelkow-Blohm Gesellschaft mit beschraenkter Haftung, Munich, Fed. Rep. of Germany

[21] Appl. No.: 53,057

[22] Filed: Jun. 28, 1979

[30] Foreign Application Priority Data

Jul. 14, 1978 [DE] Fed. Rep. of Germany ....... 2831021

[51] Int. Cl.³ ............................................ F16B 13/04
[52] U.S. Cl. ..................................... 411/501; 411/34; 411/395; 411/405
[58] Field of Search ..................... 85/77, 67, 39, 38, 4, 85/82, 70, 37

[56] References Cited

U.S. PATENT DOCUMENTS

| 1,979,686 | 11/1934 | Hall et al. ................................ 85/37 |
| 2,303,303 | 8/1965 | Laisy ......................................... 85/77 |
| 2,314,770 | 3/1943 | Cogswell .................................. 85/77 |
| 2,328,023 | 8/1943 | Lang ......................................... 85/38 |
| 2,500,172 | 1/1955 | Rohe ..................................... 85/39 X |
| 2,575,213 | 11/1951 | Fruth ........................................ 85/37 |

FOREIGN PATENT DOCUMENTS

| 2216109 | 2/1972 | Fed. Rep. of Germany .............. 85/77 |
| 932765 | 12/1947 | France ........................................ 85/77 |
| 727942 | 4/1955 | United Kingdom ........................ 85/70 |
| 519558 | 8/1976 | U.S.S.R. .................................... 85/7 |

Primary Examiner—James T. McCall
Attorney, Agent, or Firm—W. G. Fasse; D. F. Gould

[57] ABSTRACT

A tacking rivet has a shaft and a head with a longitudinal bore through the shaft and through the head. The head forms a rim extending radially outwardly and the rim or head has a divider which divides the head and/or rim into at least two portions. The divider may, for example, be a slot or recess or indentation.

6 Claims, 12 Drawing Figures

TACKING RIVET

BACKGROUND OF THE INVENTION

The present invention relates to tacking rivets or, more specifically, to a rivet body for a tacking rivet, comprising a shaft and a head with a common bore extending through both, the shaft and the head.

Such a rivet body provides with a rivet pin the so-called tacking rivet. In use, the rivet pin is inserted into the rivet body and both, the pin and the body are inserted into a respective bore extending through the part to be riveted, for example, sheet metal parts. The riveting is accomplished in that the head of the rivet pin is pulled into the shaft of the rivet body, whereby the latter is forced to bulge and thereafter the rivet pin is torn off at a predetermined location constituting a rated braking point. Such a tacking rivet may be removed by drilling a hole through the head of the rivet body by a drill bit having a diameter corresponding to the bore diameter through the rivet body whereby the remaining part of the tacking rivet falls out of the drilled hole. The rim portion of the rivet head remains on the shaft of the drill bit after the drilling operation. If a plurality of tacking rivets are to be removed by drilling, the rim portions collect on the shaft of the drill bit and such accumulations interfere with the drilling of further rivets. In order to make the drill bit ready for further drilling, it is necessary to remove the rim portions of the rivets. For this purpose it is necessary to interrupt the drilling work. The drill bit must be removed from the chuck of the drilling machine and the removal of the rivet rims may be cumbersome since they may be stuck on the drill bit shaft.

OBJECTS OF THE INVENTION

In view of the above, it is the aim of the invention to achieve the following objects singly or in combination:

to avoid the above disadvantages of the prior art, more specifically, to construct a rivet body, so that the rim portion of the rivet body head will not remain stuck to a drill bit in a boring operation for removing the rivets;

to construct the rivet head rim, so that as the result of a drilling operation the rim will fall apart into at least two portions.

SUMMARY OF THE INVENTION

According to the invention there is provided a rivet body for a tacking rivet, the head of which comprises a rim extending radially outwardly beyond the outer diameter of the rivet body shaft and the rim is divided into at least two portions. According to a preferred embodiment of the invention, the head with its rim portion is provided with a slot which extends entirely through the head and rim. The head may also be provided with at least two partial slots extending through the rim portion from the outer diameter thereof to the outer diameter of the rivet body shaft. Such slots may be replaced by recesses or indentations or the like.

BRIEF FIGURE DESCRIPTION

In order that the invention may be clearly understood, it will now be described, by way of example, with reference to the accompanying drawings, wherein:

FIG. 4 shows the top plan view and FIG. 5 shows a partially sectioned side view;

DETAILED DESCRIPTION OF PREFERRED EXAMPLE EMBODIMENTS AND OF THE BEST MODE OF THE INVENTION

Figure 1:
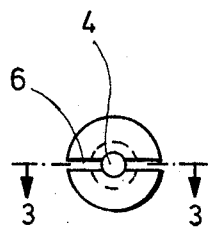
FIGS. 1 & 2 illustrate a rivet body with a fully slotted head showing the top plan view in FIG. 1 and a partially sectioned side view in FIG. 2.
Figure 2:
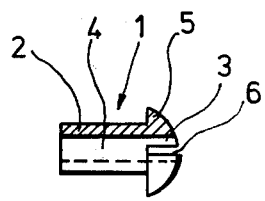
Figure 3:
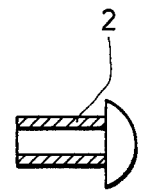
FIG. 3 illustrates the sectional view along section line 3—3 in FIG. 1.

A rivet body 1 shown in FIGS. 1, 2 and 3 comprises a shaft 2 and a head 3. A common bore 4 extends through the head and through the shaft. The head 3 has a rim 5 extending radially outwardly to an extent larger than the outer diameter of the shaft 2. Referring specifically to FIGS. 1, 2 and 3 the head 3 with its rim 5 is provided with a slot 6 extending fully through the head and rim. This embodiment of the invention may be manufactured by simply sawing the slot 6 into the head and rim. Since the shaft 2 does not fully extend into the head, as best seen in FIG. 3, the embodiment of FIGS. 1, 2 and 3 is particularly suitable for moderate riveting pressure exerted by a riveting tool not shown. Under such moderate riveting pressures the slot will not be deformed.

FIGS. 2 to 12 show various modifications, wherein the center portion of the rivet body head, to an extent determined by the outer diameter of the shaft 2, remains unchanged, since the slots 8 extend only through the rim 5a and 5b to the extent determined by the outer diameter of the shaft 2. This type of structure is suitable for higher riveting pressures.

Figure 4:
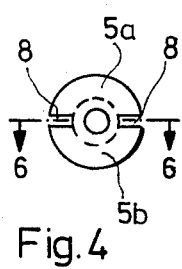
FIGS. 4 & 5 show a rivet body with two partial slots, whereby
Figure 5:
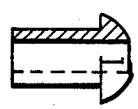
Figure 6:
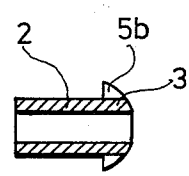
FIG. 6 is a sectional view along section line 6—6 in FIG. 4.

In FIGS. 4 to 6 the partial slots 8 pass only through the rim 5 so that the rivet head 3 remains unchanged within the diameter of the shaft 2. FIGS. 4 to 6 further show, that the rim 5 will be separated into two independent portions 5a and 5b when the shaft is drilled by a drill bit having the same outer diameter as the outer diameter of the shaft 2.

Figure 7:
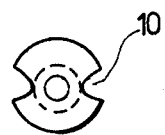
FIGS. 7 & 8 show another embodiment, wherein the rivet body head has a rim whith indentations.
Figure 8:
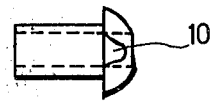
Figure 9:
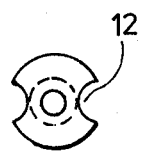
FIGS. 9, 10, show views similar to those of FIGS. 7 & 8 11 and 12 with differently shaped indentations or cutouts.
Figure 10:
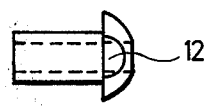
Figure 11:
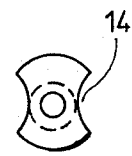
Figure 12:
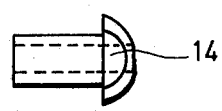

FIGS. 7 & 8 illustrate cut-outs or recesses 10 having a lateral somewhat curved shape forming a kerf 10. Such kerfs, may, for example, be cut by a saw or similar tool.

The cut-outs 12 and 14 shown in FIGS. 9 to 12 show further illustrations how the rim 5 may be divided into at least two portions. The cut-outs 12 & 14 are preferrably made in a stamping operation.

Although the invention has been described with reference to specific example embodiments, it will be appreciated, that it is intended to cover all modifications and equivalents within the scope of the appended claims.

What is claimed is:

1. A tacking rivet body, comprising rivet shaft means, rivet head means secured to said rivet shaft means, a longitudinal bore extending axially entirely through said rivet shaft means and through said rivet head means, said rivet shaft means having a given outer diameter, said rivet head means having an outer diameter larger than said given outer shaft diameter, whereby the rivet head means form a rim extending radially outwardly of said outer shaft diameter, and dividing means extending at least to said outer shaft diameter and entirely through said rim to divide said rim into at least two separate portions, said dividing means preventing said separate rim portions from remaining stuck on a drill bit used in a boring operation to remove a rivet.

2. The tacking rivet body of claim 1, wherein said dividing means comprise a slot extending through said rivet head means and entirely through said rim.

3. The tacking rivet body of claim 1, wherein said dividing means comprise at least two recesses extending entirely through said rim to said outer shaft diameter.

4. The tacking rivet body of claim 3, wherein said recesses are two partial slots extending entirely through the rim.

5. The tacking rivet body of claim 3, wherein said recesses are two indentations extending entirely through the rim.

6. The tacking rivet body of claim 3, wherein said recesses are two cut-outs extending entirely through the rim.

* * * * *

UNITED STATES PATENT OFFICE
CERTIFICATE OF CORRECTION

Patent No. 4,285,265          Dated August 25, 1981

Inventor(s) Hermann Rieper

It is certified that error appears in the above-identified patent and that said Letters Patent are hereby corrected as shown below:

On the title page insert

--[30] Foreign Application Priority Data

July 14, 1978 [DE] Fed. Rep. of Germany...P2831012.5--.

In Claim 1, line 5, after "shaft means" insert --comprising an unslotted continuous elongate annular wall--, line 14, after "rivet" insert --by solely drilling off the rivet head--.

Signed and Sealed this

Eighth Day of December 1981

[SEAL]

Attest:

GERALD J. MOSSINGHOFF

*Attesting Officer*     *Commissioner of Patents and Trademarks*